H. PRESTON.
Wheel Cultivator.
No. 80,502.  Patented July 28, 1868.
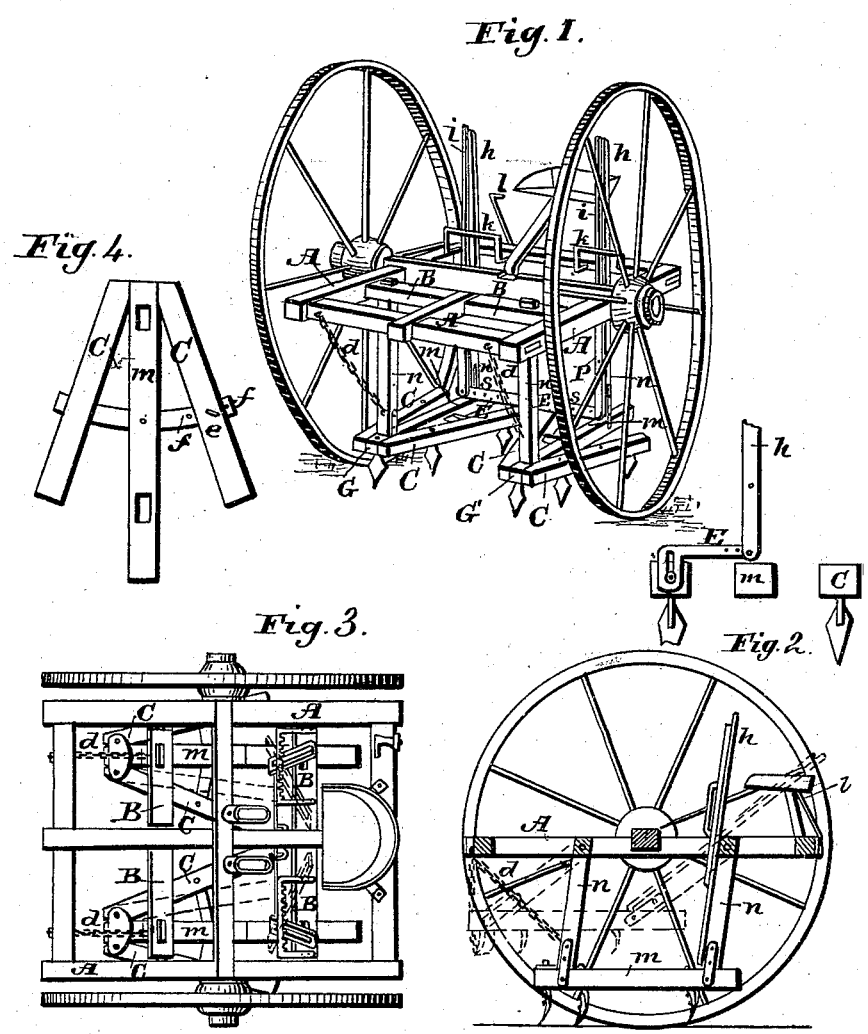

United States Patent Office.

HIRAM PRESTON, OF ORFORDVILLE, WISCONSIN.

Letters Patent No. 80,502, dated July 28, 1868.

IMPROVEMENT IN CULTIVATORS.

*The Schedule referred to in these Letters Patent and making part of the same.*

TO WHOM IT MAY CONCERN:

Be it known that I, HIRAM PRESTON, of Orfordville, Rock county, in the State of Wisconsin, have made certain new and useful Improvements in Cultivators; and I hereby declare the following to be a full and exact description of the same, reference being had to the drawings that accompany and form a part of these specifications.

The object of my invention is to provide a machine adapted to various kinds of work, simple in its structure, one easily adjusted to its various purposes, and as easily controlled.

Figure 1, perspective view.

Figure 2, sectional view, showing the manner of adjusting and controlling the shovels or cultivator-teeth.

Figure 3, plan showing the lower parts of the machine.

Figure 4, plan view of the V-shaped piece C.

Letter A, frame, permanently attached to the axle.

Letters B B B B, rocking-shafts, placed in the frame A, by which the lower parts of the machine are sustained.

Letters C C', two V-shaped parts, in which are placed the shovels or cultivator-teeth. In the centre of each of these is a straight piece, $m\,m$, extending fore and aft. To these pieces the four posts are fixed. Levers $n$ extending from the rocking-shafts B B, are attached by a hinged or movable joint.

Letters E E, arms, connecting the lever $h$ with the inner portion of C.

These V-shaped parts are adjustable, can be extended or contracted at pleasure; the two outside pieces, by removing the pins or bolts $e$, extending the parts, and placing the pins in the hole $f$, or *vice versa*, as shown in fig. 4. The inside ones are under the control of the driver by the aid of the two levers $h\,h$, arranged on each side of his seat. These levers are held at any desired point by the springs $i\,i$ and the ratchets $k\,k$, as shown in fig. 1.

By a depression of the lever $h$, the driver is enabled to raise the cultivator to clear a stone or other obstacle. When driving to or from the field, by a further depression of the lever $h$, and placing it under the catch $l$, the cultivator is raised clear of the ground, and held in position indicated by the red lines in fig. 2.

Letters $d\,d$, chains, one end attached to the front rail or bar of the frame A, and the other end to the posts or fixed levers $n$, of the forward rocking-shafts. By lengthening or shortening these chains, the machine is made to run deep or shallow, as desired.

For preparing ground for grain or for the drill, the two parts of the cultivator would be brought close together, but for cultivating corn, or anything planted in rows or drills, it is intended to allow the row to pass between the two parts of the cultivator, and the space for this purpose can be made more or less, as may be desirable, simply by moving the levers $h\,h$ towards or from the driver. The wheels are calculated to run upon the inside of the rows on either side of the one being operated upon, which passes directly under the driver's seat, and is the only one that requires his attention.

If it is desirable to move the inside parts of the cultivator farther either way, than can be done by the ordinary movement of the levers $h\,h$, it may be accomplished by detaching the lower end of the lever, removing the bolt or pin, and placing it in either of the holes in the arms E E, provided for that purpose, as shown in fig. 1, at $s\,s$.

By reference to the drawings, it will be seen that the two V-shaped parts C C are so arranged as to be operated independent of each other. One can be raised to clear a stump, stone, or other obstacle, while the other remains at work.

The chains $d\,d$ may be so arranged with a toggle-joint, that whenever the shovels come in contact with any stationary object, the toggle will give way and allow the part C C to swing back and up, so as to clear the obstruction.

The levers $h\ h$ are secured to the posts $n\ n$ by a single bolt, as shown at $p$ in fig. 1. This provides for the lateral movement of the lever, by which the inner portion of C is controlled.

What I claim, and desire to secure by Letters Patent, is—

1. The adjustable v-shaped parts C, in combination with the rocking-shaft B, when constructed and operated substantially as described and set forth.

2. The lever $h$, provided with the springs $i$, and the arm E, in conjunction with the parts C, and ratchet $k$, for the purpose of controlling the parts C, substantially as described.

HIRAM PRESTON.

Witnesses:
   I. F. MACK,
   ROBERT HEATH.